(12) United States Patent
Arnold et al.

(10) Patent No.: US 9,109,292 B2
(45) Date of Patent: Aug. 18, 2015

(54) ANTI-MICROBIAL COATED DEVICES AND METHODS FOR MAKING SAME

(75) Inventors: Derrick G. Arnold, Sandy, UT (US);
Jack F. Johnson, Sandy, UT (US);
Robert J. Robinson, Raleigh, NC (US);
Bradley F. Johnson, West Jordan, UT (US)

(73) Assignee: POLYPROTEC TECHNOLOGIES, Salt Lake City, UT (US)

( * ) Notice: Subject to any disclaimer, the term of this patent is extended or adjusted under 35 U.S.C. 154(b) by 280 days.

(21) Appl. No.: 12/954,243

(22) Filed: Nov. 24, 2010

(65) Prior Publication Data

US 2011/0206817 A1    Aug. 25, 2011

Related U.S. Application Data

(60) Provisional application No. 61/308,007, filed on Feb. 25, 2010.

(51) Int. Cl.
| | |
|---|---|
| *A23L 3/3454* | (2006.01) |
| *B05D 1/06* | (2006.01) |
| *B65G 69/20* | (2006.01) |
| *C23C 24/04* | (2006.01) |
| *A23L 3/358* | (2006.01) |
| *A23L 3/3589* | (2006.01) |
| *A23L 3/3598* | (2006.01) |
| *C23C 30/00* | (2006.01) |

(52) U.S. Cl.
CPC ............ *C23C 24/04* (2013.01); *A23L 3/3454* (2013.01); *A23L 3/358* (2013.01); *A23L 3/3589* (2013.01); *A23L 3/3598* (2013.01); *C23C 30/00* (2013.01)

(58) Field of Classification Search
CPC ..... A23L 3/3454; A23L 3/358; A23L 3/3598; A23L 3/3589; C23C 30/00; C23C 24/04
USPC ............................ 426/435; 427/427; 99/485
See application file for complete search history.

(56) References Cited

U.S. PATENT DOCUMENTS

| | | | | | |
|---|---|---|---|---|---|
| 5,302,414 | A | * | 4/1994 | Alkhimov et al. | 427/192 |
| 7,163,715 | B1 | * | 1/2007 | Kramer | 427/189 |
| 2005/0067179 | A1 | * | 3/2005 | Stark | 174/52.4 |
| 2006/0188580 | A1 | * | 8/2006 | Sacks | 424/489 |
| 2007/0156249 | A1 | * | 7/2007 | Lawrynowicz et al. | 623/23.51 |
| 2007/0281176 | A1 | * | 12/2007 | Palumbo et al. | 428/457 |
| 2008/0026026 | A1 | * | 1/2008 | Lu et al. | 424/405 |
| 2008/0124369 | A1 | * | 5/2008 | Trogolo | 424/409 |

FOREIGN PATENT DOCUMENTS

| | | | | |
|---|---|---|---|---|
| JP | 59107198 | A | * | 6/1984 |
| JP | 09140991 | A | * | 6/1997 |
| NL | 1009742 | C6 | * | 6/1999 |

OTHER PUBLICATIONS http://www.verometal.de/he/anwendungsgebiete/medical.html web entry dated Jan. 30, 2009 accessed on Feb. 4, 2014.*

* cited by examiner

*Primary Examiner* — Michele L Jacobson
*Assistant Examiner* — Subbalakshmi Prakash
(74) *Attorney, Agent, or Firm* — Workman Nydegger (57) ABSTRACT

An anti-microbial coated device includes a device sized and configured for use in a microbe-contaminating environment. The device includes a substrate having a surface configured to be exposed in the microbe contaminating environment. A cold-sprayed anti-microbial coating is deposited on at least a portion of the surface of the substrate. The anti-microbial coating includes fused metal particles and having a thickness in a range from 100 nm to 1 mm.

11 Claims, 3 Drawing Sheets

ANTI-MICROBIAL COATED DEVICES AND METHODS FOR MAKING SAME

CROSS-REFERENCE TO RELATED APPLICATIONS

The present application claims the benefit of U.S. Provisional Patent Application Ser. No. 61/308,007 filed Feb. 25, 2010 entitled ANTI-MICROBIAL DEVICES AND METHODS FOR MAKING SAME, which is hereby incorporated by reference in its entirety.

BACKGROUND OF THE INVENTION

1. The Field of the Invention

The present invention relates to anti-microbial coated substrates and methods for making anti-microbial coated substrates using cold spray and methods of use.

2. The Related Technology

It is well known that microbial contamination can occur by a person touching the same surface as another person. Devices that are known to transfer microbes through touch include door handles, toilet handles, waste container, utensils, water faucet and other products which come into contact with human beings.

One approach to reducing the communication of microbes between people is to coat the surface of such devices with an antimicrobial coating. The microbes transferred from one person to the surface are killed or substantially reduce in number by the anti-microbial agents on the surface of the device. This limits the undesired transfer of the microbes to other people who may come into contact with the device.

Numerous products have been developed with antimicrobial coatings to prevent transmission of microbes. One common approach has been to mix an antimicrobial metal with a resin and apply it to the surface of the device where the device is susceptible to contamination. However, these coatings tend to have problems with adhesion to many substrates. Also, these resins tend to encapsulate the antimicrobial metal and reduce its ability to effectively kill microbes.

BRIEF SUMMARY

The present invention relates to devices coated with an antimicrobial coating and methods for making the antimicrobial coated devices using cold spraying. The antimicrobial coating is formed from an antimicrobial metals such as copper or silver. The antimicrobial metal is provided as a powder and cold sprayed onto an exposed surface of the device. The high impact involved in cold spraying causes the antimicrobial metal particles to fuse together to form the antimicrobial coating. Antimicrobial particles striking the surface of the device may also be fused to the surface of the device, thereby creating excellent adhesion between the antimicrobial coating and the device. In addition, cold spraying allows for an extremely thin and continuous layer of antimicrobial metal. The thinness of the antimicrobial coating minimizes changes in the physical properties of the device while still providing the desired antimicrobial benefits.

In a preferred embodiment, the antimicrobial device is a food processing apparatus that includes a food processing machine part having structure that contacts food. The antimicrobial coating may be applied to at least a portion of the surface area of the structure that contacts the food. The antimicrobial coating reduces microbial contamination on the food processing equipment, thereby allowing the equipment to produce healthy cleaner products and/or to operate for longer periods of time without being shut down for cleaning.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

In one embodiment, a method for manufacturing an antimicrobial coated device may include providing a device sized and configured for use in a microbe-contaminating environment and having a surface configured to be exposed in the microbe contaminating environment. A cold-spraying apparatus is used to cold spray an anti-microbial metal powder onto the surface to form an anti-microbial coating. The coated area includes at least apportion of the area of the device that benefits from having an anti-microbial surface, such as those portion of the device that have exposed surfaces susceptible to contamination.

The device to be coated is selected according to a need to maintain a sanitary surface on the device during use. There are many devices designed and/or configured to be used in direct contact with people and/or items that need to remain sanitary in order to minimize communication of microbes. Examples of categories of devices that can be coated according to the method disclosed herein include, but are not limited to, food processing equipment, food services equipment, medical equipment, dental equipment, safety equipment, boating equipment, and combinations of these.

Food processing equipment is equipment that is used to process, prepare, and/or package food materials and products for human consumption. Examples of food processing equipment includes, but are not limited to, a conveyor, a blender, an agitator, a mixer, a liquifier, a paddle blender, a ribbon blender, a screw blender, a mixing container, a pulper, a juice extractor, a filter, an evaporator, a pump, a drier, a boiler, a homogenizer, a refrigerator, a peeler, a grinder, an emulsifier, a slicer, a disintigrator, a comminution apparatus, a washer, a shape molder, a chiller, a centrifuge, a dicer, a shredder, a wrapping apparatus, a pasteurizer, a cutter, a conveyor, a compactor, a chopper, a caser, a blower, a blancher, a bin, a lidder, a hopper, a mill, a sheeter, a tenderizer, or a container.

The foregoing food processing apparatuses (and similar devices used in processing food materials) include machine parts having structure that contacts food. The machine parts may be a blade, a panel, a paddle, a prop, an auger, a bowl, a belt, a drum, a scraper, a lid, a tube, a roller, a disk, a liner, a duct, or the like. The structure provided by these machine parts come in contact with food material as the apparatus moves, manipulates, and/or supports the food materials during food processing.

Figure 1:
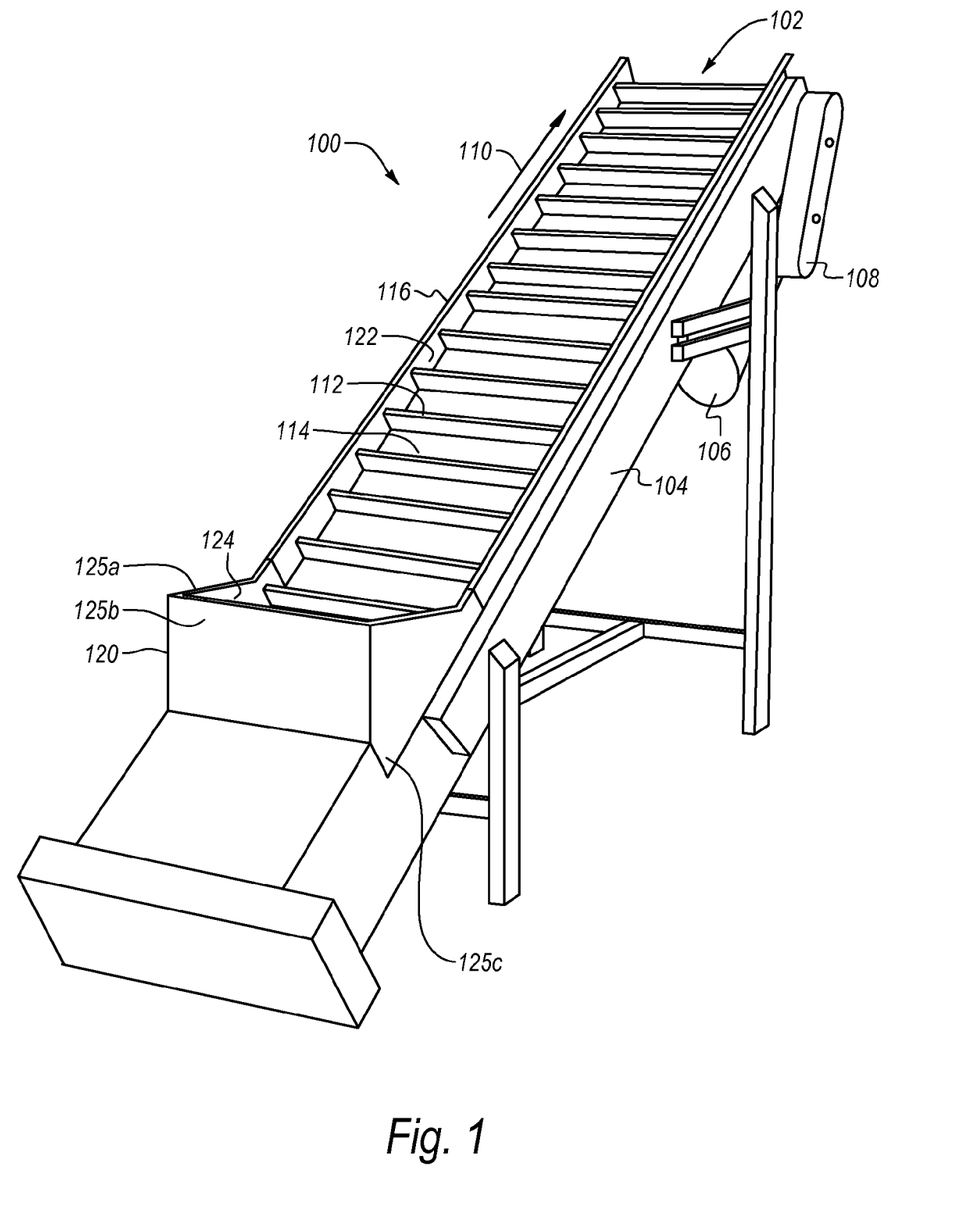
FIG. 1 illustrates a conveyor system having an anti-microbial coated conveyor belt.

In one embodiment, the machine part may be a conveyor belt, which provides a surface that supports food material as the food is conveyed from one location in a food processing facility to another location. The conveyor belt may have a planar surface or a varied surface. Typically conveyor belts that have a planar surface may be used for horizontal conveyance and conveyor belts with a varied surface can be used in as an elevator conveyor. FIG. 1 illustrates an example of an elevator type conveyance apparatus 100, which include a conveyor belt 102 positioned within housing 104. A motor 106 operates a drive mechanism 208 to cause conveyor belt 102 to advance in the upward direction 110. Belt 102 forms a continuous loop and rotates in a circular manner according to known methods in the conveyor belt art.

Conveyor belt 102 includes a plurality of ridges 112 that separate a plurality of flat areas 114 where food material can be loaded. The ridges 112 prevent food material on flat areas 114 from sliding downward. The conveyor belt 102 is flanked laterally by housing railing 116. Railing 116 minimizes food material falling off on the sides of conveyor belt 102. Conveyor Apparatus also includes a hopper 120 having raised sidewalls or paneling that define a temporary storage space that is unloaded by rotation of the conveyor belt 102.

The parts of conveyor apparatus 100 provide a substrate for an anti-microbial coating. For example, the antimicrobial cold spray coating may be on the ridges 112, flat areas 114, inside surface 122 of railing 122, and/or the inside surface 124 of the sidewalls of hopper 120. The cold sprayed coating may have a thickness in a range from 100 nm to 5 mm, or 500 nm to 5000 microns, or 1 micron to 3000 microns, or 5 microns to 1000 microns and may include copper, brass, silver, an alloy of these, or a combination of these. In other embodiments, any of the foregoing ranges of coating thickness may have upper limits less 3 mm, 2 mm, 1 mm, 500 microns, 100 microns, or 50 microns. The surfaces of the railing 116, conveyor belt 102, and/or hopper 120 are used to move and transport food material and the food material comes into contact with these surfaces, thereby providing these surfaces with a food source of organic material for microbial consumption. In addition, these surfaces are exposed to microbial loads from airborne microbes and/or microbes in the food material. The food materials are maintained sanitary for extended periods of time due to the anti-microbial coating killing microbes that might otherwise propagate on the surfaces of the conveyor apparatus.

Other anti-microbial coated devices, including but not limited to other food processing equipment, can have machine parts such as tubes, chambers, panels, exposed surfaces, and flexible or rigid fixed or moving parts that contact food in a similar manner as the machine parts described with reference to FIG. 1 and can have a cold-spray anti-microbial coating to reduce microbial contamination.

For example, the machine part may be a drum having interior walls that move food materials inside the drum as the drum rotates. The interior surfaces of the drum may include a cold sprayed anti-microbial coating as described herein. The machine part may be a scraper having a rigid flat surface that can include a cold-sprayed anti-microbial coating. The machine part may be a blade having a rigid flat surface includes a cold-sprayed anti-microbial coating. The machine part may be a prop used to agitate or mix a fluid. The prop may have all or a portion of its exposed surface coated with a cold-sprayed anti-microbial coating. The machine part may be a paddle that is rotated to perform mixing or blending. The paddle may have an exposed surface that when rotated pushes food material. The exposed surface of the paddle may be coated with a cold-sprayed anti-microbial coating. The machine part may be an auger having flighting, the surface of which is coated with a cold-sprayed antimicrobial coating. The machine part may be a bowl or other container where food materials are held for mixing and the interior surface of the bowl (i.e., the surface of the bowl or container the comes into contact with the food) may be coated with a cold-sprayed anti-microbial coating. The machine part may be a lid that covers a container, bowl, or other chamber. The inside surface of the lid may be coated with the cold-sprayed, anti-microbial coating. The machine part may be a tube or other conduit and the interior surface (i.e., the surface in contact with food material traveling in the tube) may be coated with a cold-sprayed anti-microbial coating. The machine part may be a disk that rotates to cut, chop, blend, or otherwise manipulate a food material can have flat exposed surfaces that contact food during use and the surfaces may be coated with the cold-sprayed anti-microbial coating. The machine part may be a liner to a chamber that is removable for cleaning or servicing purposes. The liner may have a cold sprayed anti-microbial coating on an exposed surface (i.e., the surface that is exposed to the interior of a chamber when the liner is installed in the device).

Those skilled in the art will recognize that the list of food processing apparatuses, machine parts, and structures above and/or the other devices disclosed herein and their structures are not an exhaustive list of devices, machine parts and/or structures that can include a cold-sprayed anti-microbial coating according to the invention.

Those skilled in the art will also recognize that the devices, machine parts, and/or structures disclosed herein do not necessarily have the entire exposed surface coated with the anti-microbial coating. Because there is a cost associated with the coating, the particular amount of the surface area that is coated will often be selected to minimize cost while minimizing the potential threat of contamination. Thus, the anti-microbial coating may be applied to portions of the devices and/or machines parts in locations where exposure to contamination is highest, such as locations where organic particulates are likely to collect or be constantly present and/or where moisture is present, and/or where airborne microbes are likely to come into contact with organic material.

As mentioned above, the present invention includes anti-microbial devices other than food processing devices. The cold-sprayed anti-microbial device can be applied to a part or structure of food service equipment, medical equipment, dental equipment, safety equipment, boating equipment, and combinations of these.

Food services equipment is equipment that comes into contact with food and beverage products for human consumption. Examples of food services equipment includes, but is not limited to, food processing conveyor belts, refrigerators, ice makers, ice scoops, food storage structures, soda dispensers, grocery carts, food storage structures, water bottles, drinking fountains, sinks, faucets, appliances, egg cartons, countertops, flooring, and the like. These devices can have surfaces that may be prone to microbial contamination. Example illustrations of some of these devices can be found in U.S. Pat. Nos. 7,025,282, 7,552,597, 7,263,856, 7,350,369, 7,393,032, 7,207,576, 7,527,174, 7,188,847, 7,287,487, 7,178,523, 7,594,706, 7,604,001, 7,314,307, 7,238,921, 7,264,189, 7,388,174, and 6,959,496, which are hereby incorporated by reference for their teaching, illustration, and use of the structure of food services devices.

The foregoing devices all have surfaces that can benefit from an antimicrobial coating according to the invention. The inside surfaces of refrigerators, including paneling, shelving, and/or drawers, can have spilled food and/or water condensation that harbors microbes. The refrigerator may be a commercial refrigerator located in a business establishment or personal refrigerators located in a person's home. The paneling or shelving of food storage structures such as those found in home pantries or grocery store food displays can be susceptible to microbial growth. Ice makers tend to have wet surfaces on, around, and/or in the storage compartment and/or opening of the storage compartment for ice, which can be contaminated with microbes. The handle portion and/or scoop of an ice scoops used to retrieve ice can be susceptible to microbial contamination due to the exposure to people's hands and moisture from the ice storage. Soda dispensers can accumulate microbes on the dispenser spouts and/or supporting trays where soda cups are placed to be filled with soda. Grocery carts can be exposed to microbes on their handle portions where people grasp the cart to push it and/or the basket portion where food products can be temporarily stored during shopping.

Additional examples of surfaces on food services equipment that can be coated with an anti-microbial coating according to the invention include surfaces of water bottles including the water bottle opening, the cap, the interior surface, and/or the exterior surface of the bottle. The buttons or levers used to dispense water from a drinking fountain may be prone to contamination from touching. In addition the surface of the receptacle of a drinking fountain provides a wet environment for growing microbes. Similarly sinks and faucets in commercial establishments and/or homes are prone to contamination on the surfaces of the handles, spouts, and/or receptacles where water, human contact, and sources of organic material are typically present. Kitchen appliances such as blenders, toasters, food processors, rice cookers, knives, cooking utensils, and/or serving utensils, may have handles and/or exterior surfaces that may be prone to microbial contamination. The upper surface of indoor flooring in homes or commercial establishments where food is prepared, stored, and/or transported may also be susceptible to microbial contamination. The surface of egg cartons used to transport eggs can be contaminated on surfaces configured to be in contact with the eggs.

Another category of device that can be coated with an anti-microbial coating according to the invention includes medical devices. Medical equipment that can be coated with the antimicrobial coating includes surgical equipment, diagnostic equipment (e.g., MRI machines and optical scanners), trays, hospital countertops, operating tables, hospital flooring, operating rooms, hospital room beds, toilets, sinks, and/or showers, wheelchairs, crutches, stethoscopes, and medical supplies such as tubing and adhesive bandages. Example illustrations of these devices can be found in U.S. Pat. Nos. 7,541,812, 7,355,617 7,296,652, 7,242,308, 7,600,274, 7,172,421, 7,254,850, 7,318,242, 7,490,619, and 7,334,440, which are hereby incorporated by reference for their teaching, illustration, and use of the structure of medical devices.

Examples of surfaces of the surgical equipment that may be prone to contamination include the surfaces of the handle portion and/or surfaces intended to contact the patient, such as a cutting surface of a scalpel. Examples of surfaces of an MRI machine that may be susceptible to contamination include the upper surface of the table upon which the patient lies. Optical scanning equipment may have surfaces for resting a person's chin and/or surfaces that come into contact with a person's face. Medical trays have surfaces that come into contact with bodily fluids and/or hospital food. Hospital countertops have an upper surface that may be exposed to bodily fluids or tissues and/or food that may contaminate the surface thereof. Operating tables may have straps, railing, and/or other surfaces that may be exposed to contamination. The present invention also includes coating the surface of hospital flooring and/or bed structures.

Yet another category of devices that may include an antimicrobial coating include dental devices. Examples of dental devices include curing lights, drilling equipment, endodontic reciprocating hand pieces, packing devices, toothbrushes, dental chairs, aspiration devices, sinks, faucets and the like. Examples of dental devices can be found in U.S. Pat. Nos. 7,144,250 and 5,339,482, which are hereby incorporated by reference for their teaching, illustration, and use of dental devices.

Other devices that can be coated include boating equipment. Boating equipment is constantly being exposed to microbes in the water being navigated. These microbes often grow on the surfaces of the boat and can cause fouling. Examples of surfaces on boating equipment that can be contaminated include, but are not limited to, the hull of the boat, the boat propeller, the boat carpeting or other flooring, and/or the boat seat cushions. Examples boating structures that can be coated are described in U.S. Pat. No. 7,302,906 and US Publication 2008/0166493, which are hereby incorporated herein by reference for their teaching, illustration, and use of boating devices. Yet other devices that can be coated include playground equipment, patio cover, tape or adhesive, toilet seat, portable toilet, exercise equipment, garbage cans, baby changing station, sports equipment, shoe insert, safety harness, safety mat, or a combination thereof.

Playground equipment can be coated on the surfaces where people hang our grasp, such as the rungs of a ladder. Patio covers can be coated on the fabric covering, which has a tendency to collect water during rain storms and/or exposure to sprinklers and are in high humidity environments. Tape and other adhesive devices can be coated on an upper surface story lower surface. Toilet seats can be coated on the upper surface configured to make contact with that person. Exercise equipment can be coated with the antimicrobial coating on the surface of the bench, bars, and/or handles that allow users to group the exercise equipment. A shoe insert can be coated on the upper surface that is configured to make contact with the foot of a person. Baby changing station may include the antimicrobial coating on the surface of planar surfaces, railings, and/or the cushioning of the baby changing station. Safety harnesses may have the antimicrobial coating applied to the surface of the straps of the harness. Athletic mats or safety nets may have the antimicrobial coating applied to the impact surface, particularly surfaces that come into contact with the feet of the person using the mat. Example illustrations of these devices can be found in U.S. Pat. Nos. 7,463,885, 7,252,232, 7,523,857, 7,231,673, 7,585,019, 7,316,237, 7,563,205, 7,426,765, 7,426,765, 7,588,114, 7,384,098, 7,367,074, and 6,774,067, which are hereby incorporated by reference for their teaching, illustration, and use of devices that are used in microbe contaminating environments.

As mentioned above, the methods of the invention include cold spraying an antimicrobial powder onto at least a portion of the surface of the device that is to be exposed to the microbe contaminating environment. The cold spraying process utilizes an apparatus for accelerating fine solid particles (e.g., having a size from about 1-50 μm) to supersonic speeds (e.g., in a range of 300-1,200 msec) and directing the particles against the surface of the device to be coated. When the particles strike the substrate surface, the kinetic energy of the particles is transformed into plastic deformation of the particles, and a bond is formed between the particles and the target surface. This process forms a dense antimicrobial coating with little or no thermal effect on the underlying substrate surface. The cold spray processing allows formation of dense, low-oxide-content deposits of anti-microbial materials on a variety of substrates, in air and at near-ambient temperatures.

The anti-microbial coating is applied to the surface of the material so as to minimize the thickness of the anti-microbial coating while maximizing anti-microbial action. The thickness of the anti-microbial coating may be in a range from 100 nm to 5 mm, or in a range from 500 nm to 5000 microns, or 1 micron to 3000 microns, or 5 microns to 1000 microns.

The anti-microbial coating can be applied in specific areas as desired. Also, the anti-microbial coating can be applied in cracks and crevices and other locations where microbial growth may be problematic.

The surface area of the anti-microbial coating may depend on the particular device being coated. However, in many embodiments, the surface area may be at least on the order of a surface area that one would grab or handle or work on. In one embodiment, the surface area may be at least 50 $cm^2$, at least 200 $cm^2$, or at least 1000 $cm^2$. In other embodiments the surface area may be much larger. For example where a conveyor belt in a food processing plant is coated or the interior surface of the refrigerator, countertops, flooring, wall paneling, the surface area to be coated may be greater than 1.0 $m^2$, greater than 5 $m^2$, or greater than 10 $m^2$. In one embodiment of antimicrobial coating the surface area in a range from 0.5 $m^2$ to 200 $m^2$, 1.0 $m^2$ to 100 $m^2$, or 2.0 $m^2$ to 50 $m^2$.

The type of material onto which the anti-microbial coating is cold-sprayed can be any solid material including, but not limited to metal, metal alloy, ceramic, organic polymers, natural fibers, natural materials such as wood, and composites such as concrete. The area that is cold sprayed includes at least a portion of the surface of the device that benefits from anti-microbial properties. As mentioned, the anti-microbial coating can be applied to an exposed surface susceptible to contamination, a handle or other member of the device that is specifically configured to be grasped or manipulated by a person, or a working surface configured to come into contact with microbes or a working surface that provides a particularly rich environment for propagating microbes.

In one embodiment, the surface to which the anti-microbial is applied is of a flexible substrate. If desired, the flexibility of the substrate in the location of the anti-microbial coating may have a flexural strength less than 40 MPa, less than 20 MPa, or even less than 10 MPa as measured according to ASTM D790. The substrate may have the foregoing flexibility even after the anti-microbial coating is applied. This is typically achieved by maintaining a relatively thin anti-microbial coating (e.g., less than 2000 microns or even less than 1000 microns).

There are significant advantages to the cold spray process. Because the process occurs essentially at room temperature, copper, which is a reactive metal can be applied in an open-air environment with little or no oxidation. Also, nearby undamaged surface is not exposed to extreme temperature or chemical conditions used in conventional thermal deposition techniques. This allows for polymeric materials and low melting point materials to be coated with the anti-microbial coatings. Because the anti-microbial coating is applied at ambient pressure, no vacuum chamber is required.

The deposition rate can be relatively high, thereby allowing large surface areas to be coated. The deposition rate can be in a range from 0.5 g to 50 g per minute, more preferably 1 g to 10 g per minute, depending on the nozzle size and spray gas flow rate. The surface area of the antimicrobial coating can be almost any size and is typically at least as large as the surface area of objects designed to be handled by a person.

The antimicrobial powders include one or more metals having antimicrobial properties. Examples of suitable antimicrobial metals include silver, copper, zinc, mercury, tin, lead, bismuth, cadmium, chromium, cobalt, nickel, thallium, combinations of these and alloys of these. Preferred metals include copper and/or silver. Other metals may be blended with the antimicrobial metals to achieve desired mechanical and/or aesthetic properties. For example additional metals that can be used include aluminum, iron, vanadium, stainless steel, aluminum-zinc alloy and the like. In one embodiment the antimicrobial metal powder (e.g., copper and/or silver) may be cold sprayed with a second metal to produce a desired coating color and/or applied using an oxygenated carrier case to oxidize some or all of the metals in the metal powder to create a desire hue or color. For example, when copper is applied to a substrate the coating color may be copper orange. When silver is applied the coating color may be a shiny to pearl white silver. However when copper is applied with an oxygen carrier gas the coating may be a green color. By blending different volumes of powder the color can be changed. Adding 2% iron by volume to silver may produce a pink hue color coating. Adding silver to copper may give a peach hue color coating.

The antimicrobial metal powder is comprised of a plurality of metal particles characterized by an average particle size in a range from 5 nm to 50 µm, more preferably 10 nm to 10 µm, and most preferably 20 nm to 1 µm. The size of the particles may be selected to achieve a desired grain size in the resulting coating. The anti-microbial coatings may have a particularly small grain size due to the very small metal particles from which they are derived. The metal particles tend to produce coatings with grain sizes of similar scale because cold spray processing temperatures are much lower than the metal melting point, which avoids grain growth conditions.

Metal powders suitable for preparing the antimicrobial coatings are commercially available. Cold spray coating devices useful to practice the method of the invention are commercially available from Ktech Corporation, ASB Industries, Barberton Ohio, and the Obninsk Center for Powder Spraying in Russia.

Figure 2:
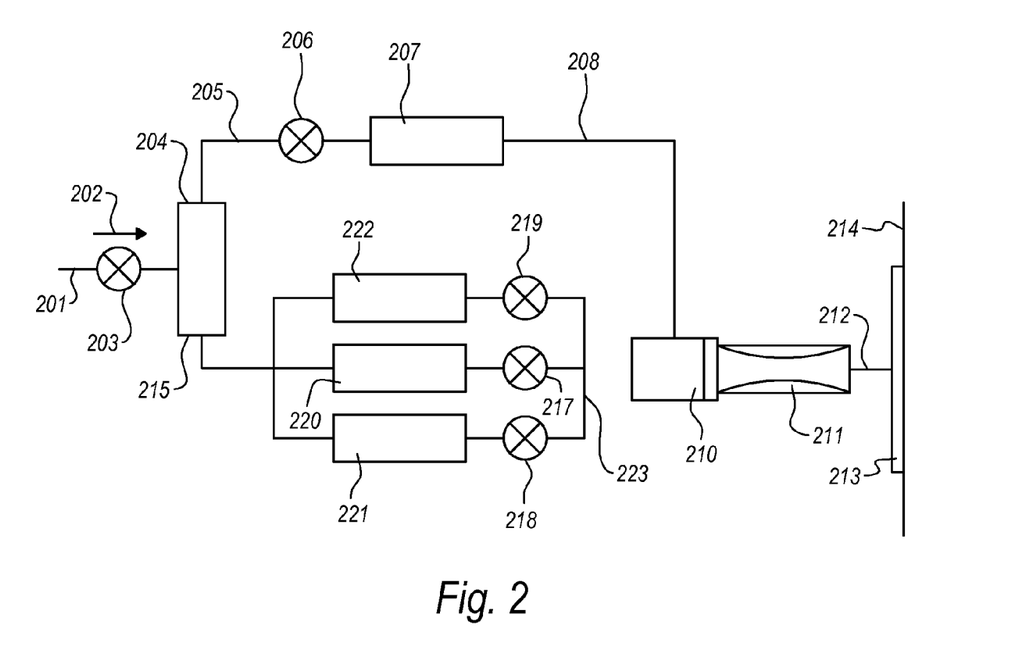
FIG. 2 illustrates a cold spray system for coating a device according to the methods of the present invention.

FIG. 2 shows a schematic of a cold spray apparatus useful for practicing the method of the invention. Compressed gas from a gas supply is supplied along a pneumatic line 201 in the direction 202 via shut-off and control valve 203, gas distributor 204, hose 205, and valve 206, pre-heated to a desired temperature with an in-line heater 207 and directed to a mixing chamber 210 via hose 208. Metal powder including an anti-microbial metal is added to one of multiple feed hoppers 220, 221 and 222, which are controlled by valves 217, 218, and 219, respectively. The other two hoppers can hold steel balls and glass beads for cleaning and shot-peening processes, respectively. In normal operation only one hopper valve is open for a specific process. Usually the agglomerate is put into hopper 220 that is controlled by valve 217. In the coating process, compressed gas enters the hopper 220 and carries the anti-microbial powder, via valve 217, to mixing chamber 210 through hose 223. In the mixing chamber 210, the anti-microbial metal powder is mixed with the heated pressurized gas to provide a particle-gas stream. The particle-gas stream is accelerated into a supersonic jet by passing through a Laval nozzle, 211. Thus, the particle-gas stream obtains sufficient velocity in the direction 212 for the anti-microbial metal powder to deposit anti-microbial metal particles onto the surface of a device 214, forming a coating 213.

The device 214, can be translated with an X-Y translation stage (not shown) that allows control of the area of the deposition.

To cover large surface areas, the cold-spray apparatus may be moved relative to the part being coated and/or the part can be moved relative to cold-spray apparatus. By moving the cold-spray apparatus and/or the part relative to one another, any size of substrate can be coated and parts that have curved surfaces may also be coated. The particular movement of the cold spray apparatus and the part to be coated will depend on the shape and size of the part. For example, where the part is a belt, the belt may be rotated in a similar manner as belts are rotated. The cold spray apparatus may remain in a fixed position until one or more complete rotations are made to coat a portion of the belt. The cold spray device can then be moved lateral to the direction of rotation and being coating another section of the belt until the entire belt is coated.

In some cases, the surface to be coated is on the inside of a chamber and the cold spraying apparatus may not fit within the chamber. In other embodiments, the part to be coated may be to large or cumbersome to coat when assembled. In these cases, the part can be coated in pieces and then assembled. With reference to FIG. 1, the walls of hopper 120 may be coated as three separate flat pieces and then assembled to make hopper 120. Other devices that have interior surfaces such as drums, conduits, mixing chambers, and the like can be manufactured in a similar manner.

Figure 3:
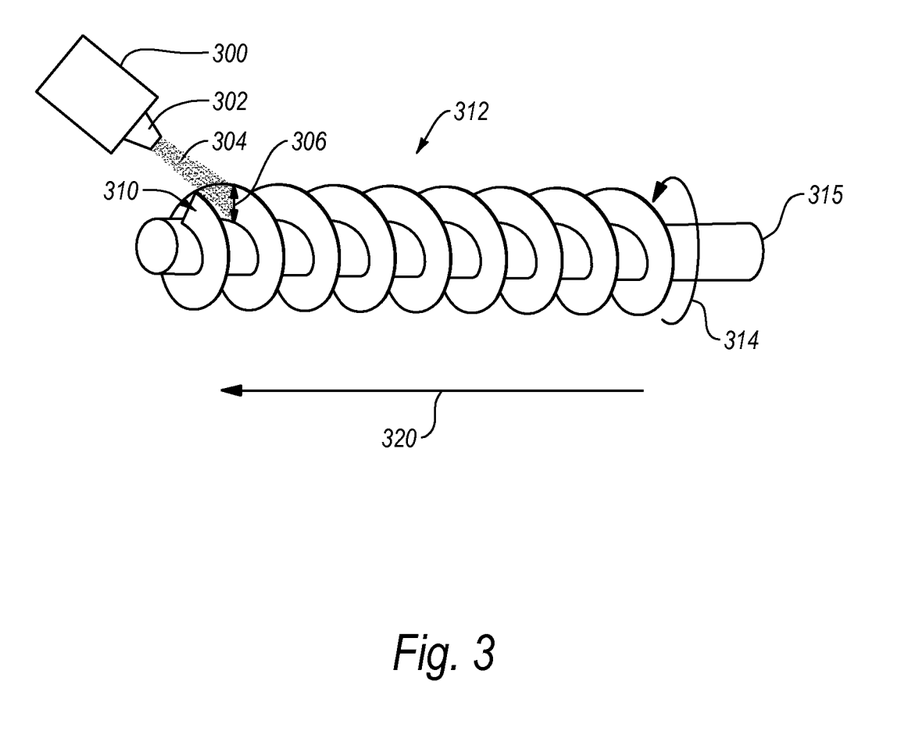
FIG. 3 illustrates a process for applying a cold-spray coating to an auger according to one embodiment of the invention.

The present invention also includes applying the cold spray coating to curved and/or convoluted structures. FIG. 3 illustrates a schematic showing coating the flighting of an auger. In this embodiment, a cold spraying device 300 is positioned to coat the flighting structure 310 of auger 312. The cold spraying apparatus 300 includes a nozzle 302 configured to spray the anti-microbial powder. The sprayed powder forms a spray stream 304. The spray stream 304 has a particular width 306 that is determined in part by the distance of apparatus 300 from part 312. In one embodiment the spray stream 306 can have a width 306 that is substantially the same as the width of the flighting. Alternatively, spray apparatus 300 may have a width 306 that is less than the width of the flighting. In this case, apparatus 300 may be moved laterally (i.e., in a direction from the center of the flighting toward the outside of the flighting or vice versa) to cover the width of the flighting. In addition, auger 312 can be rotated as indicated by arrow 314. Rotation of auger 312 can be carried out using an electric motor 316 and drive shaft 318, which is coupled to the shaft of auger 312. To maintain the spray stream positioned on flighting 310, the auger 312 (and optionally motor 316) may be advanced as indicated by arrow 320 while auger 312 is rotated. Alternatively, cold-spray apparatus 300 may be advanced in the direction opposite arrow 320. By controlling the movement of auger 312 relative to cold spraying apparatus 300 and vice versa, a complicated spray pattern can be easily projected onto the surface of flighting 310. Similar techniques may be used to coat devices, parts, and structures of any of the devices described herein.

The pressurized gas accelerant in some cases can be an important parameter in cold spray processing. Typically in cold spray processes, helium, or a mixture of helium and nitrogen, is used to accelerate particles with a size range of from 5 to 50 μm. Helium is preferred in some cases because it has a very high sonic velocity, and larger particles can achieve $V_c$ using it as an accelerant. Other gases including nitrogen, air, argon and the other noble gases, carbon dioxide and mixtures thereof can also be used effectively depending upon the ductility of the material, particle size and gas temperatures.

The method of the invention can be accomplished using nitrogen, argon, or mixtures thereof, as the primary accelerating gas. Air can also be used in cases where the reactivity of oxygen is not an issue. Preferred gases for the invention are argon, air, nitrogen and mixtures thereof. The compressed gas usually has a working pressure of 70 to 700 psi, depending upon the metal or alloy to be coated, nozzle type and the properties of the work piece. Preferably, the gas has a working pressure of 90 to 300 psi. The gas stream is heated, usually to a working temperature of 30 to 600° C., and preferably 200 to 400° C., before it enters the mixing chamber, 110. The heated gas allows for a higher velocity to be achieved in the supersonic jet and keeps the gas from rapidly cooling and freezing once it expands past the throat of the nozzle. U.S. Pat. No. 6,722,584, Kay, et al, hereby incorporated by reference, describes a convenient commercial source of a heating element, a Monel™ 400 tube, wound in the form of a coil, and powered by a welding power supply.

The rate of addition of anti-microbial powder to the mixing chamber is controlled by the hopper valve, 117. The material hopper can be configured in several ways to deliver precise amounts of powder to the mixing chamber. One configuration, delivers precise amounts of powder that is picked up by a non-heated compressed gas stream and delivered to the mixing chamber. The rate of addition of powder is a primary parameter used in controlling the rate of deposition of metal particles on the surface of the device. The optimal addition rate depends upon several parameters including the gas flow rate, the loading of metal powder, the type of material and thickness of the coating desired. The optimal addition rate is determined empirically using several trials for each material. With a fixed device translation speed or jet translation speed, an optimal addition rate is that suitable for forming a uniform and desired thickness coating in one pass. The particle addition can be driven by a gas stream through a hose from powder hopper to the mixing chamber, while the addition rate is adjusted by a hopper valve 117. Alternatively, several passes of the jet over the surface of the device can be made.

The particle-gas stream provided in the mixing chamber 110, accelerates by passing through a Laval nozzle, 111, to form a supersonic jet that is directed at a work piece to be coated. The exit port of the nozzle is some working distance from the work piece, preferably 10 to 30 mm and most preferably 15 to 25 mm. An X-Y translation stage can move the device and the rate of movement can control (at least in part) the deposition rate. Alternatively, the mixing chamber and Laval nozzle, together control the area of deposition, and the rate of movement controls the deposition per unit area. Repeated scanning of the work piece often can give more uniform coatings than a single pass.

The deposition efficiency of the process depends on the type of the metal particles, nozzle type, substrate material, gas temperature, and gas pressure, which affect the particle velocity. Usually if the particle velocity is too low, the metal particles to deform plastically, resulting in poor deposition efficiency. If the particle velocity is too high, the hard spheres tend to abrade the surface, removing coating rather than depositing it. Thus, for the process of the invention, there is a minimum critical velocity (Vc) and a maximum velocity (Vm) between which is an optimum velocity (Vo) that, at a specific temperature, gives an optimum deposition efficiency. In practical situations, monitoring gas pressure is much easier than monitoring gas-particle stream velocity. Thus, gas pressure and temperature are the parameters most often used to control particle velocity; and too low or too high particle velocity can result in low deposition efficiency.

The method of the invention can be used in combination with pre-cleaning processes. For instance, the surface of the device can be treated with a gas stream with entrained abrasive agent prior to the coating process to remove contaminants and provide a fresh surface for bonding. For the cleaning process, a second material hopper, 121, communicating with the mixing chamber 110, may contain the abrasive agent including those selected from the group: glass spheres, sand, alumina, silicon carbide, and steel spheres.

The present invention also relates to method for minimizing communication of contaminating microbes through contact with the device. The method includes providing an anti-microbial coated device as described above. The anti-microbial device includes a substrate having a surface where at least a portion of the surface is coated with a cold-sprayed anti-microbial coating. The anti-microbial coating includes fused metal particles having a thickness in a range from 200 nm to 1 mm. The surface of the substrate is then exposed to a microbial load under conditions suitable for microbial growth. The anti-microbial coating is allowed to kill at least 90% of the microbial load, more preferably at least 95%, and most preferably at least 99% of the microbial load.

The devices can advantageously be used in conditions that are amenable to microbial growth conditions without the adverse affects of microbial contamination. Conditions in which the anti-microbial coating can have a beneficial effect vary widely. For example, the solute concentration of the surrounding environment may affect microbial growth. In a hypotonic environment, where the solute concentration inside is greater than that outside of the cell, osmotic pressure will cause water to enter the cell and eventually cause it to burst. Cells may try to adjust to this situation by producing or taking in more solutes. In a hypertonic environment, where the solute concentration is greater outside than inside of the cell, water leaves the cell shrinking the plasma membrane and dehydrating the cell. In this case the cell will become inactive and stop growing.

The microbe contaminating environment may also include sufficient water for microbial growth. Metabolic activity and reproduction of cells require water. The transport of material such as nutrients, wastes, toxic materials, and other compounds in and out of the cell requires water. Water exists in two different forms. Bound water has a physical bond to other compounds in the growth environment and is not available for use in cellular functions. Available water is free and available for microorganisms to use. The degree of water availability for chemical activity and growth is called the water activity ($a_w$). The water activity is equivalent to the ratio of the vapor pressure of the growth medium to the vapor pressure of pure water. The values range between zero and one. The activity of pure water is equal to one.

Osmotic pressure, relative humidity, freezing point, and boiling point affect the water activity. Water activity is inversely proportional to osmotic pressure and directly proportional to relative humidity. Increasing the solute concentration and lowering the relative humidity would result in a reduction in water activity. Microorganisms differ in their abilities to grow at various water activities. Examples of minimum water activities include, the following: for bacteria $a_w$ is at least 0.9, for yeast, $a_w$ is at least 0.87, for molds, $a_w$ is at least 0.8, for halophilic bacteria $a_w$ is at least 0.75, for xerophilic molds $a_w$ is at least 0.65, and for osmophilic yeasts $a_w$ is at least 0.60.

The pH in an environment may also affect cell growth. While various different microorganisms have different maximum, minimum, and optimum pH levels, the growth conditions in which the antimicrobial coated devices of the invention are typically configured to be used is in a range from pH 4 to pH 9.

Temperature also greatly affects the growth and function of microorganisms. The temperatures above and below the tolerance of the organism can prevent enzyme catalyzed reactions that are important to cell function from taking place. The devices of the invention may be configured and arranged for use in temperatures ranging from 0° C. to 40° C. Microorganisms that can grow at temperatures between 0 and 40° C. include Psychrotrophs and Mesophiles. Psychrotrophs typically grow at temperatures between 0 and 30° C. and are often a factor in the spoilage of refrigerated foods. Mesophiles typically have optimal temperature between 20 and 40° C.

The gaseous environment surrounding microorganisms can have a significant impact on their growth and metabolic system. The devices of the invention may be configured and arranged for use in environments that include oxygen. Those skilled in the art are familiar with the environmental configurations that lead to cell growth and increased contamination of a surface of a device.

The foregoing conditions are example conditions in which the anti-microbial coated devices can be advantageously used to minimize contamination in an otherwise microbial contaminating environment.

The following examples illustrate example methods for making antimicrobial coated devices and using the devices.

Example 1

Example 1 teaches a method for making an anti-microbial coated for use in food manufacturing. A conveyor belt having a width of 24" and a length of 25' is coated with a copper anti-microbial coating. The conveyor belt is made from high density polyethylene having a thickness of ⅛" and a flexural stiffness less than 20 MPa.

The conveyor belt is cold sprayed with a copper powder. The copper powder has a mean particle size of 50 μm. The copper powder is sprayed at supersonic speeds at the surface of the conveyor belt for a sufficient time to form a cold-sprayed copper coating with a thickness of 3000 microns. Essentially the entire upper surface of the conveyor belt is coated with a fine anti-microbial copper coating.

The conveyor belt can be included in a food processing conveyor apparatus (e.g., conveyor system 200). The food processing conveyor apparatus includes a drive mechanism for rotating the coated conveyor belt. The anti-microbial coating is typically coated on the outside surface of the conveyor belt such that food material disposed on the upper surface of the conveyor belt comes into contact with the anti-microbial coating. The food processing conveyor apparatus can be configured to transport food products such as cereal. A method for using the conveyor apparatus and coated conveyor belt includes operating the conveyor under standard in an open environment in a food processing facility where the conveyor belt comes into contact with food material (e.g., cereal) and is exposed to airborn microbes or microbes in the food materials. The antimicrobial coating is allowed to kill at least a portion of the microbial load exposed on the anti-microbial coating.

Example 2

Example 2 is a hypothetical example illustrating the use of an anti-microbial coated conveyor belt to kill microbes in a microbial contaminating environment. As shown in Table 1, 13 different strains of microbes are prepared, including *Salmonella* cultures, *Listeria monocytogenes* cultures, and mold cultures.

TABLE 1

| *Salmonella* Composite Culture | SRCC Number |
|---|---|
| *Salmonella* Heidelberg | FSC-CC 1801 (ATCC 8326) |
| *Salmonella* Enteritidis | FSC-CC 1395 (ATCC 13076) |
| *Salmonella* Typhimurium | FSC-CC 1397 (ATCC 13311) |
| *Salmonella* Senftenberg | FSC-CC 2470 (ATCC 43845) |

| *Listeria monocytogenes* Composite Culture | FSC-CC Number | Serotype |
|---|---|---|
| *Listeria monocytogenes* (Environmenatal isolate) | 7 | ½ b |
| *Listeria monocytogenes* (Hot Dog isolate) | 525 | ½ c |
| *Listeria monocytogenes* Scott A | 1234 | 4b |
| *Listeria monocytogenes* | 2310 | ½ a |

| Molds-Composite Culture | FSC-CC Number |
|---|---|
| *Penicillium citrinum* | 1123 |
| *Asperigillus niger* | 772 |
| *Asperigillus penicilloides* | 1260 |
| *Cladisporium cladosporoides* | 1374 |
| *Rhizopus oryzhae* | 2066 |

The strains of *Salmonella* are cultivated in tryptic soy broth (TSB), individually, and incubated at 35° C. for 18-24 h. The strains of *L. monocytogenes* are cultivated in tryptic soy broth with 0.6% yeast extract (TSBYE), individually, and incubated at 35° C. for 18-24 h. A cell suspension is prepared for each strain used in the inoculum. Cell suspensions are mixed to prepare an inoculum, which contains approximately equal numbers of cells of each strain. The composite cultures are then stored at 4° C., (for up to 26 h) while the culture level is determined by plating serial dilutions of the composite on tryptic soy agar (TSA). The plates are incubated at 35° C. for 24 h prior to enumeration. Verification of *Salmonella* and *L. monocytogenes* composite culture is conducted by streaking onto xylose lysine desoxycholate (XLD) and modified oxford agar (MOX) and incubating at 35° C. for 18-24 h.

The mold strains are prepared on Potato Dextrose Agar (PDA) with antibiotics, individually, and incubated for 5 days at 25° C. under aerobic conditions. A cell suspension is prepared for each strain used in the inoculum. Cell suspensions are mixed to prepare an inoculum, which contains approximately equal numbers of cells of each strain. The composite culture is then stored at 4° C. until use. The culture level is determined by direct microscopic count. Broth cultures are stored at 4° C. prior to inoculation. Dilutions are prepared with Butterfield's phosphate buffer. The composite cultures (0.5 ml) are evenly distributed over the entire surface area of each coupon of anti-microbial coated conveyor belt. Initial inoculation levels are targeted at $10^7$ per coupon. After inoculation, samples are stored at room temperature for 2 h and analyzed for counts. Uncoated coupons are used as controls. The experimental protocol is summarized below in Table 2 in which a total of 36 microbial analyses are performed.

TABLE 2

| Coating level | Sampling time | *Listeria monocytogenes* | *Salmonella* | Mold |
|---|---|---|---|---|
| 0 mm coating (control) | 0 hr | 1-3 samples | 4-6 samples | 7-9 samples |
| | 2 hr | 10-12 samples | 13-15 samples | 16-18 samples |
| 1 mm coating | 2 hr | 19-21 samples | 22-24 samples | 25-27 samples |
| 3 mm coating | 2 hr | 28-30 samples | 31-33 samples | 34-36 samples |

Coupons of anti-microbial coated conveyor belt (10 cm×10 cm) are placed in a sterile stomacher bag and rinsed with 10 ml Neutralizing Buffer for 1 min to wash the inoculated cells from the surface. Serial dilutions are performed using Butterfield's phosphate buffer. All samples are analyzed by the pour plate technique. Typical colonies are considered as confirmatory. The methods of analysis is outlined below in Table 3.

| Test | Medium | Incubation Time/ Temperature/ Atmosphere |
|---|---|---|
| *Listeria monocytogenes* | Trypticase Soy Agar with Yeast Extract with Modified Oxford Agar overlay | 48 hours/30° C./ aerobic |
| *Salmonella* | Trypticase Soy Agar with XLD overlay | 48 hours/35° C./ aerobic |
| Mold | Potato Dextrose Agar with antibiotics | 5 days/25° C./ aerobic |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An anti-microbial food processing apparatus, comprising:
    a food processing machinery part configured for use in processing food, at least a portion of the machinery part forming a structure that contacts a food material, the structure comprising:
    a substrate having a surface area; and
    a cold-sprayed anti-microbial coating deposited on at least a portion of the surface area of the substrate, the anti-microbial coating comprising impact-fused copper particles that form a continuous layer of copper having a thickness in a range from 100 nm to 500 μm,
    wherein the flexural strength of the coated structure is less than 40 MPa as measured according to the ASTM D790 standard.

2. A food processing apparatus as in claim 1, wherein the food processing machinery part includes a conveyor belt and wherein the cold-sprayed anti-microbial coating is deposited on at least a portion of the surface of the conveyor belt.

3. A food processing apparatus as in claim 2, wherein the conveyor belt has a surface area in a range from 0.5 $m^2$ to 200 $m^2$.

4. A food processing apparatus as in claim 1, wherein the anti-microbial coating includes silver, alloys thereof, or combinations thereof.

5. A food processing apparatus as in claim 1, wherein the anti-microbial coating forms a continuous layer of copper having a thickness in a range from 1 micron to 50 microns.

6. A food processing apparatus as in claim 1, wherein the structure includes one or more joints forming a crevice and the anti-microbial coating is deposited in the crevice.

7. A method for manufacturing an anti-microbial food processing apparatus, the method comprising:

providing a food processing machinery part configured for use in processing food, at least a portion of the machinery part forming a structure that contacts a food material, the structure comprising a substrate having a surface area; and depositing a copper powder on at least a portion of the surface area of the substrate to form a cold-sprayed anti-microbial coating deposited on at least a portion of the surface area of the substrate, the anti-microbial coating comprising impact-fused copper particles that form a continuous layer of copper having a thickness in a range from 100 nm to 500 μm, wherein the flexural strength of the coated structure is less than 40 MPa as measured according to the ASTM D790 standard; and wherein providing the food machinery part and depositing the copper powder produces an apparatus as recited in claim 1.

8. A method as in claim 7, wherein the copper powder has an average particle size in a range from 1 micron to 250 microns.

9. A method as in claim 7, wherein the copper powder is sprayed onto the surface at a velocity in a range from 300 to 1,200 meters per second.

10. A method as in claim 7, wherein the copper powder is cold-sprayed using a carrier gas at a temperature in a range from 300° F. to 800° F.

11. A method as in claim 7, wherein the surface area of the anti microbial coating covers an area in a range from 0.5 $m^2$ to 200 $m^2$.

* * * * *